S. C. GOODSELL.
Lathe-Chucks.
No. 137,674.　　　　　　　　　Patented April 8, 1873.
Fig. 1.
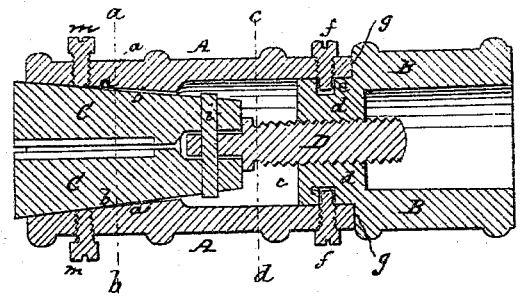
Fig. 2.　　　　Fig. 3.
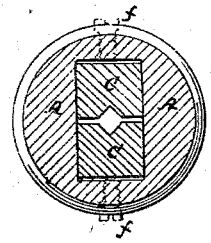 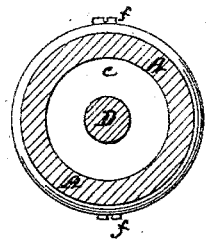
Fig. 4.
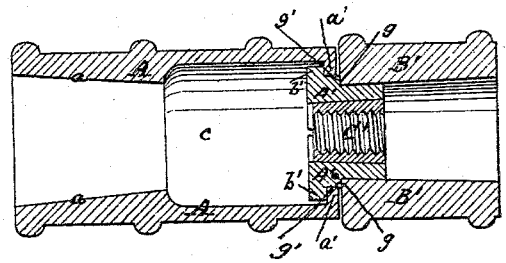
Witnesses.　　　　　　　　　Inventor.
　　　　　　　　　　　　　Samuel C. Goodsell
　　　　　　　　　　　　　by atty A. Pollok

UNITED STATES PATENT OFFICE.

SAMUEL C. GOODSELL, OF WESTVILLE, CONNECTICUT.

IMPROVEMENT IN LATHE-CHUCKS.

Specification forming part of Letters Patent No. 137,674, dated April 8, 1873; application filed January 2, 1873.

*To all whom it may concern:*

Be it known that I, SAMUEL C. GOODSELL, of Westville, county of New Haven and State of Connecticut, have invented certain new and useful Improvements in Lathe or Drill Chucks, of which the following is a specification:

This invention has for its object the production of a simple, cheap, and effective drill or lathe chuck. Discarding the spring-jaws and the radial jaws moving out and in in the chuck-head hitherto in use, I employ a pair of jaws provided with external tapering surfaces working against correspondingly-inclined surfaces in the chuck-head, the jaws being mounted upon a pin or pins, or the equivalent of the same, on which they are free to slide, so that their contiguous faces may readily adapt themselves to and take a firm hold of the stem of the drill or other tool inserted between them, the said pin serving also to connect them with the tail-screw, by which they are moved in the one direction or the other in the chuck-head. The screw is operated by means of a nut abutting against the rear of the chuck-head, and held to the latter by means of a grooved neck fitting within the chuck-head, and receiving in its groove two or more set-screws inserted through the head.

The manner in which my invention is or may be carried into effect will be readily understood by reference to the accompanying drawing, in which—

Figure 1 is a longitudinal central section of my improved chuck, the section being on the line 3 3 of Fig. 2. Fig. 2 is a transverse section on the line $a\,b$ of Fig. 1. Fig. 3 is a transverse section on line $c\,d$ of Fig. 1.

A represents the chuck-head; B, the nut; C, the jaws; and D, the tail-screw. The chuck-head has formed through it an opening for a portion of its length corresponding in contour with the contour of the two jaws, and having its faces $a\,a$ tapered or inclined to correspond with the inclined outer surfaces $b$ of the jaws. The remainder of this opening, in rear of the rectangular portion which receives the jaws, is cylindrical, as shown at $c$, to receive the cylindrical neck $d$ of the nut B, which is inserted and fits therein, and has formed in its periphery an annular groove, $e$, into which project set-screws $f$, two or more in number, inserted through the chuck-head, as shown. The nut has formed on it, in rear of the neck $d$, a shoulder or abutment, $g$, which, when the nut is in place, forms a bearing for the rear end of the chuck-head. The neck $d$ of the hollow nut is pierced longitudinally and axially with a screw-threaded hole, through which passes the tail-screw D, to the head or front end of which the jaws are attached. The connection of the jaws with the tail-screw is effected by means of a transverse pin, $i$, which projects on each side from the head of the screw, and on which the inner ends of the jaws are mounted in such manner that they can slide freely thereon, within the limits of the opening in the chuck-head, toward and away from each other, the jaws being thus enabled to preserve the parallelism of their contiguous faces in grasping different-sized tool-shanks, and to adjust and adapt themselves bodily and throughout their length to the shank inserted between them. A groove of V or other suitable shape, to receive the shank of the tool, is formed in the inner face of each jaw, as shown.

After the tool has been inserted between the jaws the nut is rotated so as to draw back the screw, which will carry back with it the jaws, and the latter, coming in contact with the inclined faces $a$ of the chuck-head, will be forced together so as to gripe the tool tightly, adjusting themselves, as just stated, on the pin $i$. The shoulder $g$ on the nut forms a bearing or abutment for the chuck-head to bear against when griping the drill. The set-screws $f$ serve to hold the nut and chuck-head together, and as a means to enable the nut to be rotated to force the jaws outward when the drill is to be released.

The mounting the jaws loosely upon the pin $i$ is productive of other advantages even more important than those stated. The tail-screw, when it is unscrewed from the nut B, can, together with the jaws which it carries, be lifted out of the chuck-head; and when this is done the jaws can be readily disconnected from the tail-screw by being slipped off from the pin $i$. This enables me to use several pairs of jaws with the tool to take various sizes of drills. In practice I use an assortment of four pairs of jaws, the largest designed to take a half-inch drill, the smallest one-thirty-second-inch drill, and the others intermediate sizes, so that I can thus readily adapt the chuck to hold any drill from one-half to one-thirty-second of an inch diameter, and this without interfering with the capacity of the chuck at all times to hold the drill, whether large or small, with perfect security and ease, and with equal power.

In Fig. 4 I have shown an arrangement of the nut and abutment which avoids the necessity of the set-screws just referred to. In this case the chuck-head has at its rear end an internal annular flange, $a'$, which catches under a corresponding flange, $b'$, on the exterior, and at the front end of a split thimble or tube, $A'$, which is inserted into the hollow holder $B'$ until a shoulder, $g'$, on the thimble rests on the shoulder or abutment $g$ of the part $B'$, which said abutment $g$ answers to the correspondingly-lettered parts in the preceding figures. The bore of the thimble is concentric with or has the same axis as the chuck-head; and the distance between its shoulder $g'$ and flange $b'$ is slightly greater than the thickness of flange $a'$ on the chuck-head, so that the latter can be freely turned or revolved whenever it is desired to loosen or tighten the jaws. The split thimble $A'$ is expanded and held in place by means of a tapering internally screw-threaded steel nut, $C'$, which is forced or driven into the divided thimble so as to expand it against the holder D. Near the front of the chuck-head are set-screws $m$, which may be employed to take up any wear that might, by any possibility, occur in process of time by reason of the working of the jaws against the interior of the chuck.

What I claim as my invention, and desire to secure by Letters Patent, is—

1. The combination, with the chuck-head and the adjusting-nut, of the tail-screw screwing into the adjusting-nut, and the griping-jaws with inclined surfaces working against correspondingly-inclined surfaces in the chuck-head, and mounted on a pin or pins on the tail-screw, under the arrangement and for operation substantially as set forth.

2. In combination with the chuck-head having outwardly-inclined faces, as described, the tail-screw, removable from the front of the chuck-head, as described, and the griping-jaws mounted on said tail-screw, substantially as set forth, so as to be removable from the chuck-head bodily with the tail-screw, and at the same time to be readily adjusted to or detached from said tail-screw, for the purposes stated.

3. The combination, with the chuck-head, of the adjusting-nut, screw-threaded internally to receive the tail-screw, and provided with a shoulder or abutment, against which the chuck-head rests, the two being connected and held together substantially as herein shown and set forth.

In testimony whereof I have signed my name to this specification before two subscribing witnesses.

SAMUEL C. GOODSELL.

Witnesses:
LUZON B. MORRIS,
EARELESS P. ARVINE.